July 10, 1928. 1,676,656

G. A. LUTZ

RESISTANCE WELDING ELECTRODE

Filed Oct. 21, 1926  2 Sheets-Sheet 1

INVENTOR
Geo A. Lutz
BY
T. F. Bourne
ATTORNEY

July 10, 1928.
G. A. LUTZ
1,676,656
RESISTANCE WELDING ELECTRODE
Filed Oct. 21, 1926    2 Sheets-Sheet 2
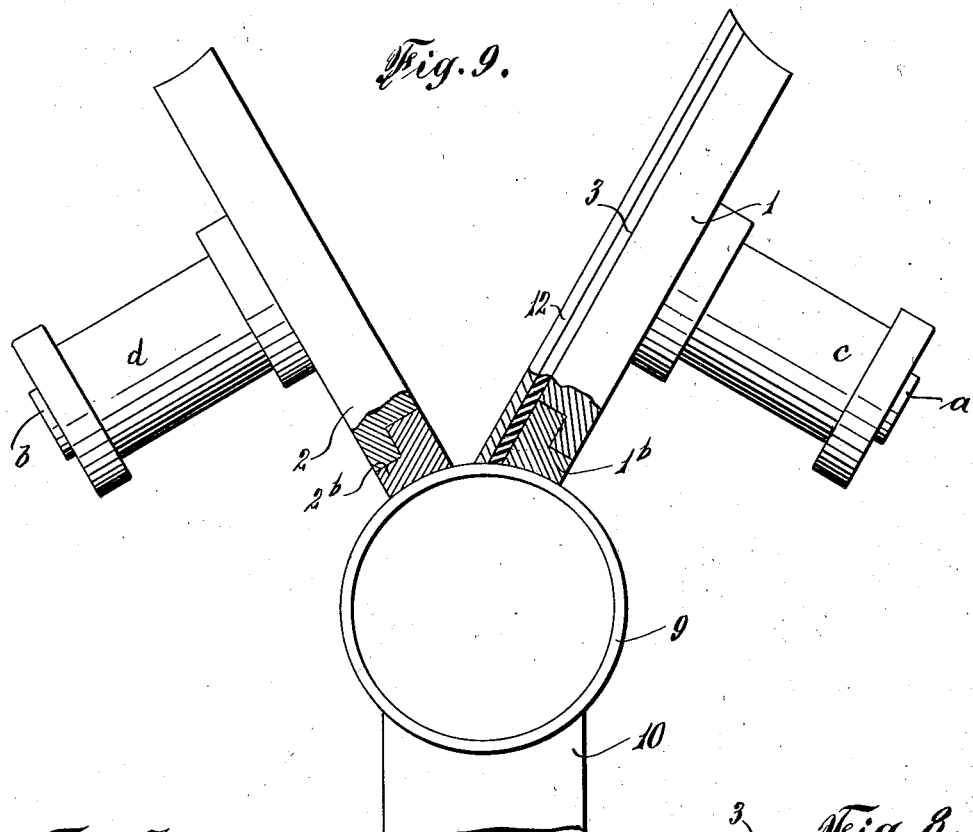
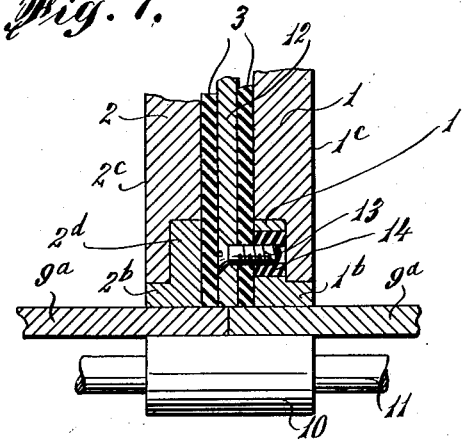
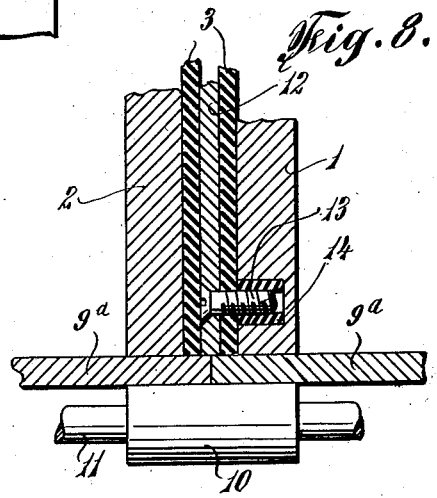
INVENTOR
Geo A. Lutz
BY
ATTORNEY Patented July 10, 1928.

1,676,656

UNITED STATES PATENT OFFICE.

GEORGE A. LUTZ, OF CRANFORD, NEW JERSEY, ASSIGNOR TO AMERICAN CIRCULAR LOOM COMPANY, OF PITTSBURGH, PENNSYLVANIA, A CORPORATION OF PENNSYLVANIA.

RESISTANCE WELDING ELECTRODE.

Application filed October 21, 1926. Serial No. 143,105.

Heretofore, so far as I am aware, in the electric welding of seams of relatively thin metal pieces, such as for welding metal tubes, the seams of the tubular stock have been passed between electrodes, whereby a high welding heat is generated in the metal along the seam for welding the edges of the seam together. In some machines for such purpose a good continuous weld has been produced where the stock has been fed along the terminal electrodes at a relatively moderate speed, say, from 20 feet to 30 feet per minute more or less, producing what is commonly called a continuous weld. But an objection has been found in that the metal has formed what is called a bur or projection along the seam, requiring mechanical operation to remove the bur, such as by grinding the same to make a smooth joint or smooth surface on the tube or pipe. A machine carrying out welding as last set forth is set forth in United States Letters Patent to Parpart, No. 658,741, granted September 25, 1900. In another class of electric welding machine the bur along the seam of the tube or pipe has been practically eliminated by passing the tube stock along the electrodes at a considerably increased speed relative to the flow of the electric current, such as 60 feet to 70 feet per minute, more or less. But in such machines a good close weld has not been produced but a weld in the form of closely spaced welding intervals or what is called a "recurrent welding effect", or in which the texture of the metal which forms the seam is nonuniform. That is to say, the welding of the abutting edges of the metal is not actually continuous at all points. Tubing of the character last set forth is disclosed in Letters Patent to Johnston, No. 1,388,434, granted August 23, 1921. Welded metal tubes or pipes set forth in said Johnston Letters Patent are used for various purposes, such as where a cheap thin-walled tube is desired. Tubing of the Johnston patent can be made substantially free from bur along a seam because of the speed of feed of the tube stock relatively to the cycles of the welding current and the "recurrent" form of the weld. Where a tube or pipe having a continuous close weld is desired without a bur along the seam the method set forth in the Johnston patent is not applicable because of the succession of distinct welds or recurrent welding effects along the seam.

The object of my invention is to produce a welded seam in metal tubes, pipes or sheets which shall have a substantially continuous weld without the production of a bur along the seam, whereby by merely passing the stock between electrodes my improved tube may be made without requiring the removal of a bur along the seam.

In carrying out my invention I pass the seam of the stock between terminal electrodes included in an alternating current circuit and at the welding point I oppose the seam with a mechanical resistance sufficient to prevent the edges of the stock that are heated to a welding temperature from rising or protruding from the stock, whereby as the welded portion of the seam advances from the electrodes the surface of the seam will be substantially smooth and without bur or protuberance. My improved effect can be accomplished regardless of the speed of travel of the stock with respect to the electrodes.

In carrying out my invention I provide spaced terminal electrodes to bear on the stock to be welded adjacent to a seam between abutting or opposing edges of the stock for the passage of welding current through the latter, and I locate between the electrodes a member adapted to bear against the seam along the welding edge, and not in circuit with the electrodes, whereby as the seam is heated during the passage of the stock along the electrodes said member will keep the metal at the edges of the stock from protruding and a substantially smooth welded seam will be produced.

In the example of my invention illustrated in the accompanying drawings I provide two spaced annular electrodes adapted to bear on the stock to be welded on opposite sides of the seam between the abutting edges of the stock, and between said electrodes I provide a member having its periphery substantially coincident or in the same radius with the surfaces of the electrodes that bear on the stock, the member being in position to engage the stock at the point of the welding heat so as to resist protruding or rising of the heated metal beyond the surface of the stock to prevent the formation of a bur or ridge along the seam, My invention further comprises novel details of improvement that will be more fully hereinafter set forth and then pointed out in the claims.

Reference is to be had to the accompanying drawings forming a part hereof, wherein Fig. 1 is an edge view illustrating a construction embodying my invention for welding the seam of a metal tube;

Figs. 7 and 8 are sectional details of modifications; and

Fig. 9 is a partly sectional side view illustrating a modification.

Similar numerals of reference indicate corresponding parts in the several views.

Figure 1:
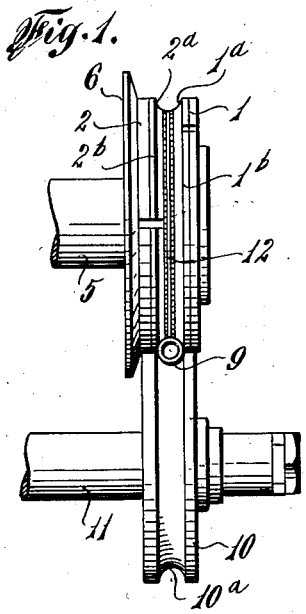

At 1 and 2 a pair of secondary terminal electrodes are indicated located side by side and spaced apart with insulation 3 therebetween. In Figs. 1 to 8 the electrodes are shown as annular and may be secured together by insulated screws 4, (Fig. 4), suitably spaced apart. The electrodes 1 and 2 are particularly adapted, as illustrated, for use in an electric transformer having rotative electrodes, such as set forth in my Letters Patent No. 1,594,891, granted August 3, 1926, wherein the contact terminal electrodes and the primary and secondary of the transformer rotate as a unit. At 5 a shaft or axis portion of the secondary of a rotative transformer is indicated, such as set forth in my said Letters Patent, a portion of the transformer shell being indicated at 6 in Fig. 1. The electrode 1 is shown secured to the transformer part 5 by screw threads at 7, (Fig. 4), and said electrode supports the electrode 2 out of contact with the part 5, as indicated at the opening or space 8.

Where the electrodes are to be used for welding the seam of stock for tubes or pipes 9, (Fig. 1), the outer surfaces of the electrodes are grooved or recessed at 1ª, 2ª, to substantially conform in radius to the radius of the tube or pipe. At 10 is indicated a feed compressing roll which, when used for welding tubes or pipes, will have a grooved periphery at 10ª substantially corresponding to the radius of the groove of the electrode, which roller coperates with the tube or pipe blank or stock for forcing the latter against the electrodes. Shaft 11 of roller 10 may be journaled in a well known way, and driven by power if desired. Where the stock is the form of flat metal sheets 9ª the contact surfaces of the electrodes and of the roller 10 may be flat, as indicated in Figs. 7 and 8. When the stock to be welded is between the electrodes and the roller 10 and the electrodes are rotated the stock or blank will be fed at a desired speed and the flow of the electric current between the electrodes will cause welding heat at the seam of the blank or stock for welding the edges of the metal at the seam in a well known way.

Between the electrodes 1 and 2 I place a member 12 that is adapted to bear against the metal stock being welded at the abutting edges thereof along the seam, at the welding location, coincident with the contact of the electrodes against the stock. The periphery of member 12 preferably conforms to the peripheries of the electrodes, and is preferably curved according to the radius of the electrode recesses 1ª and 2ª to correspondingly engage the tube stock at the seam thereof. The member 12 may be made of suitable metal adapted to withstand the welding heat at the seam of the stock, and I preferably use a high heat and electrical resisting alloy, such as an alloy of copper and tungsten. The member 12 is insulated from the electrodes 1 and 2 and is preferably secured to at least one of the electrodes. In Figs. 1 to 8 the member 12 is shown located between the insulation 3 so as to be out of electrical circuit with the electrodes. The member 12 is shown secured to one of the electrodes, (such as the electrode 1), by means of screws 13 that pass through said member and through the interposed insulation 3 and are screwed into a threaded bore in insulating bushings 14 secured in bores 15 in the electrode, whereby the peripheries of the member 12 and of the electrodes are retained in operative relation and rotate in unison. The heads of the screws 13 are insulated from the electrode 2 by the interposed insulation 3.

In the form shown in Figs. 1 to 8 the electrodes 1 and 2 are side by side and parallel, while in Fig. 9 the electrodes are at an angle to one another and suitably spaced apart, to bear upon the tube stock on opposite sides of the longitudinal seam or joint between the abutting edges thereof. In Fig. 9 the member 12 is shown carried by the electrode 1 and insulated therefrom in the manner before described, the periphery of said member bearing upon the stock at the seam or joint. The peripheries of the electrodes and of member 12 are curved to conform substantially to the radius of the tube stock. The electrodes 1 and 2 are carried by conducting shafts $a$ and $b$ journaled in bearings $c$ and $d$ and supplied with current in a well known way.

The electrodes may be made in a single piece of suitable conductive metal, such as copper, in a well known way, as illustrated in Fig. 8, to carry a desired current. In the form shown in Figs. 1 to 7 and 9 I have illustrated operating contact or surface portions or sections 1$^b$ and 2$^b$ located at the peripheries of the body portions 1$^c$ and 2$^c$ to engage the metal 9 or 9$^a$ to be welded. The contact portions 1$^b$ and 2$^b$ may be secured to the body portions 1$^a$ and 2$^a$ by means of screws 16, (Figs. 4 and 5), or by means of silver solder, or by both, or in any desired way. To enable the working contact portions 1$^b$ and 2$^b$ of the electrodes to engage the work or metal 9 without permitting the body portions 1$^c$ and 2$^c$ to engage said metal I recess the body portions 1$^c$ and 2$^c$, at their inner edges or corners annularly at 1$^d$ and 2$^d$ and set the contact portions or sections 1$^b$ and 2$^b$ into the respective recesses, where they are secured together in manner before stated. The metal of the body portions and of the contact portions of the electrodes touch one another at the surfaces of the recesses, as said surfaces are relatively long or extended, to make good electrical contact for carrying large quantities of current.

The contact portions or sections 1$^b$ and 2$^b$ of the electrodes are made of a relatively high heat resisting metal compared to the body portions 1$^c$ and 2$^c$ of the electrodes. I preferably use a high heat resisting alloy, such as an alloy of copper and tungsten, which will withstand the high heat generated at the points of contact of the portions 1$^b$ and 2$^b$ of the electrodes with the metal 9 or 9$^a$ for welding the latter without the copper of the body portions 1$^a$ and 2$^a$ becoming injured from the heat.

When the edges of rolled sheet metal are to be welded to form tubes or pipes, as indicated at 9, the outer surfaces of the portions or sections 1$^b$ and 2$^b$ of the electrodes are grooved or recessed at 1$^a$ and 2$^a$, (Fig. 4), to substantially conform in radius to the radius of the tube or pipe.

Figure 2:
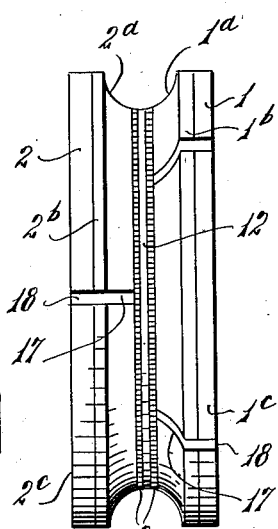
Fig. 2 is an enlarged edge view of the electrodes with my improved bur-resisting member therebetween, according to Fig. 1.
Figure 3:
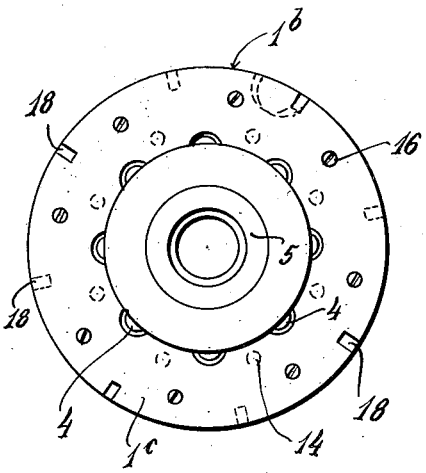
Fig. 3 is a face view of part of Fig. 1.
Figure 4:
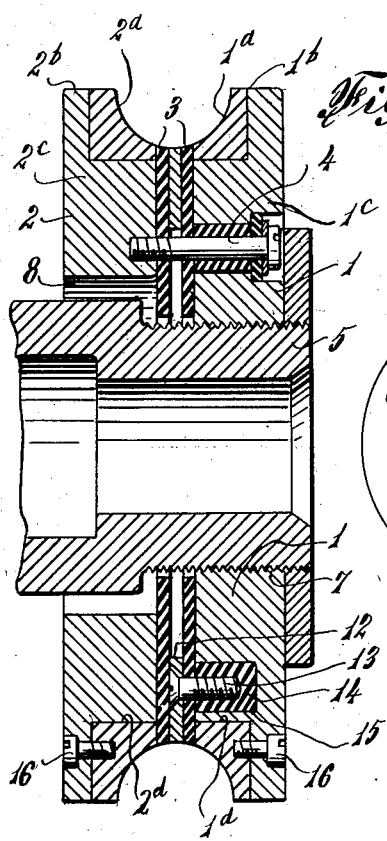
Fig. 4 is as enlarged central section.
Figure 5:
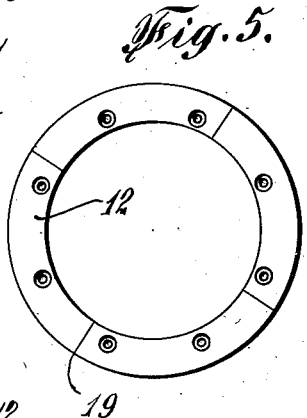
Fig. 5 is a side view of the bur-resisting member.
Figure 6:
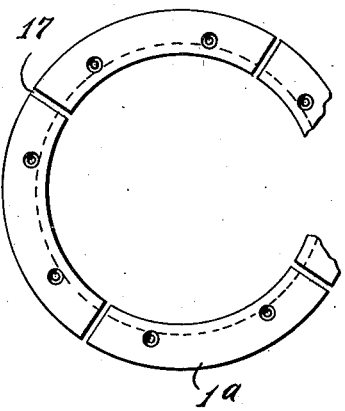
Fig. 6 is a face view of contact portions.

When the metal to be welded is flat the contact surfaces of the portions 1$^b$ and 2$^b$ will be similar, and the contact surfaces or portions 1$^b$ and 2$^b$ may be arranged as shown in Fig. 7, or in such a way that the body portions will not engage the metal 9$^a$ to be welded. While the surfaces of the contact portions or sections 1$^b$ and 2$^b$ may be continuous I have shown said portions in several successive pieces around the surfaces of the electrodes, with recesses at 17 between the adjacent ends of said pieces coincident with corresponding recesses 18 in the peripheries of the body portions 1$^c$ and 2$^c$, (Fig. 2). The construction described provides spaced peripheral contact sections to engage the metal to be welded. The recesses 17 and 18 may extend in the material of the electrodes at an angle to the axes thereof in such a way that the recesses of one electrode oppose the metal of the other terminal electrode, or said recesses may be disposed parallel to the axis of the electrode. The arrangement described respecting the contact portions 1$^b$, 2$^b$, is similar to the corresponding parts set forth in my application for patent on electric transformer electrodes, filed August 17, 1926, Serial No. 129,741.

The member 12 will preferably be of higher electrical resistance, or electrical and heat resistance, than the contact portions 1$^b$, 2$^b$ of the electrodes. The seam opposing member 12 is located, at its peripheral portion, between the adjacent parts of the contact portions 1$^b$ and 2$^b$, and insulated therefrom by insulation 3, and their operating peripheries substantially correspond for engagement with the stock to be welded. While the member 12 may be continuous peripherally I have shown the same comprising several successive pieces which may substantially abut at adjacent ends to engage the seam of the metal being welded.

My improvement may be used in any desired or well known form of electric welding apparatus provided with means for causing feed of the metal stock relatively to the electrodes and the seam resisting member 12 at a desired speed. When the electric current flows between the electrodes through the metal of the tube or other stock to be welded said metal will be heated to a welding temperature along the seam. The rate of feed of the stock may be such as to produce a good close weld, say from 30 to 40 feet per minute with a suitable alternating current flow. The pressure of the electrodes and feed roll or rolls against the tube stock will force the abutting edges of the metal along the seam together, providing a path for the current and causing welding of the edges. Under such conditions and as heretofore practiced a bur would form along the welded seam or joint, but in accordance with my invention the seam or joint opposing member 12 bears firmly or forcibly against the stock along the seam or joint, at the welding point where the current flows between the electrodes and simultaneously therewith, and prevents the protrusion of the metal along the seam, thereby resisting the pressure of the rotating electrodes which would otherwise tend to cause the heated metal at the seam edges to protrude into the space between the electrodes under the conditions aforestated. In other words, simultaneously with the flow of the current along the stock across the seam between the rotating electrodes the rotating member 12 presses on the metal at the seam during travel of the stock to prevent the formation of a bur along the seam.

In the practice of my invention the seams of metal tubes have been welded with a close permanent weld without the formation of a bur or protrusion and with a smooth surface along the welded portion, and it has not been necessary to grind or otherwise treat the finished welded tube to produce a smooth surface along the weld. So-called thin-walled tubing may be produced as well as tubing having any gage wall that can be worked in the welding machine. The speed of feed of the stock and the rate of flow of the electric current relatively thereto may be in any way desired without raising a bur along the seam because of the counteracting pressure or resistance of the rotative member 12 against the fused metal between the electrodes.

In accordance with my invention an improved welding together of the abutting edges of metal stock may be effected at a considerable saving of expense, which is of great advantage in producing electrically butt-welded tubing, since as the tubing is discharged from the machine it is finished, so far as the welding operation is concerned, without requiring removal of a bur or the like.

Having now described my invention what I claim is:—

1. An electrode for welding metal comprising a body portion of a highly conductive metal and a contact portion of a higher heat resisting metal than the body portion secured thereto, and a member adjacent to the electrode and located in position to bear upon metal being welded to prevent protrusion of part of said metal at the welding point.

2. Electrodes for welding comprising a pair of annular metallic body portions secured together in spaced relation and having peripheral contact portions of higher heat resisting metal than the body portions, and an annular member located in the space between said body portions and insulated therefrom, said member being secured to one of said body portions and having its periphery in position to bear against the edge of stock being welded to prevent protrusion of said stock.

GEORGE A. LUTZ.